United States Patent [19]

Plahm et al.

[11] Patent Number: 5,540,035
[45] Date of Patent: Jul. 30, 1996

[54] CONTINUOUS VERTICAL FORM-FILL-SEAL PACKAGING MACHINE WITH SYNCHRONIZED PRODUCT CLAMP

[75] Inventors: Jack E. Plahm; Robert S. Saak; Forrest C. Bacon, all of Conyers, Ga.

[73] Assignee: Kliklok Corporation, Decatur, Ga.

[21] Appl. No.: 350,877

[22] Filed: Dec. 7, 1994

[51] Int. Cl.⁶ .................................................. B65B 9/00
[52] U.S. Cl. ................................ 53/451; 53/450; 53/550; 53/551
[58] Field of Search ............................. 53/450, 451, 550, 53/551, 552, 525, 437

[56] References Cited

U.S. PATENT DOCUMENTS

| | | |
|---|---|---|
| 3,525,193 | 8/1970 | Cutler et al. . |
| 3,668,815 | 6/1972 | Henry et al. .................... 53/24 |
| 3,684,254 | 8/1972 | Henry . |
| 4,563,862 | 1/1986 | McElvy . |
| 4,599,850 | 7/1986 | Kopp . |
| 4,663,917 | 5/1987 | Taylor et al. . |
| 4,722,168 | 2/1988 | Heaney . |
| 4,726,168 | 2/1988 | Seko . |
| 4,727,707 | 3/1988 | Hadden ............................ 53/451 |
| 4,744,202 | 5/1988 | Wylie . |
| 4,751,808 | 6/1988 | Hadden . |
| 4,757,668 | 7/1988 | Klinkel et al. . |
| 4,800,707 | 1/1989 | Rabus . |
| 4,856,258 | 8/1989 | Buford et al. ................. 53/138.8 |
| 4,955,176 | 9/1990 | Seko et al. ..................... 53/550 |
| 4,974,396 | 12/1990 | Gaukler . |
| 4,996,825 | 3/1991 | Bacon et al. . |
| 5,062,253 | 11/1991 | Bacon et al. .................... 53/451 |
| 5,125,213 | 6/1992 | Focke et al. .................... 53/525 |
| B14,288,965 | 3/1985 | James . |

Primary Examiner—Lowell A. Larson
Assistant Examiner—Gene L. Kim
Attorney, Agent, or Firm—King & Schickli

[57] ABSTRACT

A continuous vertical form-fill-seal packaging machine is disclosed, along with a related method, utilizing a synchronized product clamp for staging/settling each product batch. The film feeding, carriage driving, sealing jaw movement, as well as the clamp operation, are computer controlled. In the continuous film/tube feed mode, the sealing jaws move in a modified sine wave motion with the film; the clamp for staging the product batches moving in a similar manner, but 180° out-of-phase. Each product batch is released by the clamp adjacent to the sealing jaws so that the drop to the blousing plates and eventually into the bag being formed is minimized. The clamp is vibrated to further enhance the coalescing and settling function.

24 Claims, 5 Drawing Sheets

CONTINUOUS VERTICAL FORM-FILL-SEAL PACKAGING MACHINE WITH SYNCHRONIZED PRODUCT CLAMP

TECHNICAL FIELD

The present invention relates to the field of form, fill and seal packaging systems, and more particularly to such a system incorporating an improved product batch staging operation that is computer controlled in conjunction with the film feeding and sealing arrangement to increase the efficiency of the operation.

BACKGROUND OF THE INVENTION

Machines and related processes for forming, filling and sealing flexible, pillow-shaped bags made from continuous packaging film are well known. These machines are widely used to package a variety of loose products, such as snack foods, frozen foods and the like. These machines typically include a continuous web of packaging film, a tube former for converting the web into a hollow tube and a reciprocating carriage with opposed jaws for stripping, sealing and cutting the tube to form a series of filled bags at high speed. One of the most successful approaches for forming bags in this manner calls for the use of a continuous, but variable film feed in conjunction with a constant motion carriage that carries the operating jaws for stripping/sealing/cutting. In particular, this prior art arrangement has a preferred embodiment wherein the carriage is operated at its top speed in order to enable the machine/method to form, fill and seal bags at a rate of up to 120–140 bags per minute. The maximum speed of the carriage determines this high output of the machine and the feeding of the film/tube, the operation of the sealing jaws and other ancillary functions track the carriage motion through a control means, such as a three axis coordinator of a microprocessor. This state of the art machine/method is set forth in an application assigned to the present applicant entitled Continuous Vertical Form-Fill-Seal Packaging Machine With Constant Motion Carriage, Ser. No. 08/12,548, filed Mar. 11, 1994, now U.S. Pat. No. 5,533,222.

While this prior art packaging machine/method out-performs all other continuous machines that we are aware of on a wide variety of loose products, some light weight products, such as potato chips, can occasionally present a problem at the very highest packaging speeds. For example, light weight fragments or crumbs in a product batch of potato chips sometimes have a tendency to float as they fall by gravity along the film/tube. This causes a delay of the entire batch entering the bag before the sealing jaws are closed in order to form the seal and cut the first bag in the series away from the film/tube. When the fragments are caught in the seal area, an imperfect seal can result.

In this prior art machine and method, a partial solution to this problem is offered; i.e. stripping just prior to sealing takes care of removing some of the lagging or late arriving fragments or crumbs from the seal area. The stripper plates are moved downwardly across the seal area relatively faster than the film feed, and in this way the plates are effective to strip any product from the critical zone. While the stripping operation works well, it is for those lightest fragments/crumbs that have the greatest tendency to float where an additional solution is needed. The additional solution should be such as to allow an increase of the output of the package machine or method up to the maximum limit in the range of 120–140 bags per minute. In addition, the solution should not be one that would add additional mass to the carriage, and thus cause a deleterious increase in the operating inertia, thus defeating the purpose of the prior inventive concept. Maintaining maximum carriage speed and thus the least cycle time for the packaging machine/method is a very important aspect of the invention.

It has long been known to employ a clamp for the film/tube above the sealing jaws in order to catch and collect each product batch before it enters the bag being formed. One of the earliest uses of a product clamp is shown in the patent to Tew et al. U.S. Pat. No. 3,256,673. However, as can be seen by viewing this disclosure, a machine or method utilizing the apparatus and techniques taught in this patent provides a maximum cycle time that is more than that demanded in the industry at the present time. The machine in the '673 patent utilizes components that have high inertia and can be operated only in a very slow, intermittent fashion. In addition, the clamp for collecting the product is in a fixed position with no provision for movement, even for adjustment to a different sized bag being formed.

Working from the same basic concept, several attempts have been made to improve the packaging operation using the stationary film/tube clamp concept. Representative arrangements of this type are shown in the Henry et al. U.S. Pat. No. 3,668,815 entitled Vibrating Clamp Product Settler and the Henry U.S. Pat. No. 3,684,254 entitled Vibrating Clamp Product Settler With Interrupter; both the '815 and '254 patents being owned by the present assignee. A similar intermittent operating arrangement utilizing a product clamp, but mounted in a different fashion is illustrated in the McElvy U.S. Pat. No. 4,563,862 entitled Package Forming Apparatus With Combined Holding and Stripper Mechanism, also owned by the present assignee.

While these improved clamp concepts have provided substantial increases in performance, and particularly with regard to vibrating of the clamp to help the settling of the product, neither patent disclosure envisions operating at the maximum speed with continuous film/tube feeding up in the range of 120–140 bags per minute. Other than the vibrating action that promotes the efficient settling of the product, there is no provision for staging of the product batch by moving or extending the clamp along the longitudinal axis of the film/tube for the purpose of both forming and releasing each product batch in the most efficient manner.

At the time of the advances in the vibrating product settler, as shown in the '815 and the '254 patents, and in the similar arrangement for mounting and operating the product clamp as taught in the '862 improvement patent, it was felt by many in the industry that product clamps, with or without vibration, had been utilized to their maximum extent. As far as has been able to be determined, the optimum operating speed and efficiency with the clamps in an intermittent packaging operation had been attained.

However, contrary to the conventional thinking, we have recently discovered that a key additional advance has been overlooked in the area of use of a clamp to enhance the operating efficiency of a machine or method, particularly with continuous film feed. More specifically, the improvement that is now contemplated is in the area of extending or moving the clamp in a longitudinal direction along the film/tube in such a fashion as to be synchronized or coordinated with the sealing jaws on the moving carriage. We have found that it is possible to form the product batch as the clamp is moving, improve the product coalescing and settling within the batch, and then release the batch in the optimum location adjacent the sealing jaws. In this manner, the chance of having lagging crumbs caught in the seal area is virtually eliminated. Furthermore, a significant cycle time reduction and overall speed improvement is attained. Indeed, with the addition of the product clamp with means for extending it along the longitudinal axis of the film/tube, the desired increase in operating speed up into the range of 120–140 bags per minute easily rivals the operation of the more costly machines utilizing the rotating head assembly type machines with multiple carriages.

SUMMARY OF THE INVENTION

Accordingly, it is a first object of the present invention to provide a film feeding, clamping and sealing system, and related method for packaging that results in improved seal integrity, as well as greater efficiency and speed of the continuous motion machines of the prior art.

It is still another object of the present invention to provide a packaging apparatus and related method for continuous film feeding that not only provides for the most efficient operation in terms of feeding, stripping the product and sealing each bag, but provides for a moving clamp that quickly and efficiently stages, and in turn coalesces and settles, each product batch as it approaches the sealing jaws for clean release and entry into the bag being formed.

It is another object of the present invention to provide a packaging apparatus and related method for improved film feeding, sealing and product staging/settling in a machine or method utilizing a form-fill-seal packaging format.

Another object of the present invention is to provide a new packaging system that provides for precise control of the product staging/settling/stripping/sealing for efficient forming of the bag while minimizing the cycle time of the operation.

A still further object of the present invention is to provide combined film/tube feeding, product staging/settling, stripping and sealing apparatus and method characterized by exact, synchronized control so as to provide maximum packaging speed and efficiency.

It is still a further object of the present invention to provide a form-fill-seal apparatus and method with product staging including early forming of the product batch and delayed release providing not only an increased speed over the prior art, but also assuring minimum faulty seals from trapped fragments or crumbs.

A further object of the present invention is to provide a film feeding, clamping and sealing apparatus and method wherein all of the essential controls for film/tube feeding, carriage movement, sealing jaw actuation and clamp operation are computer controlled utilizing a 4-axis coordinator through individual servo motors.

It is still a further object of the present invention to provide an apparatus/method of forming a bag including film/tube feeding/stripping/blousing of the bag in combination with a clamp for staging/settling of the product and pre-blousing of the bag, to thereby further enhance the speed and efficiency of the overall packaging system.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

Accordingly, to achieve the foregoing and other objects, and in accordance with the purposes of the present invention as described herein, an improved apparatus for use in packaging loose product in a bag formed from a continuous tube of film is provided characterized by increased seal integrity and even more increased speed and efficiency than heretofore attainable. The improvement is particularly useful in combination with the film feeding and sealing apparatus and method set forth in the prior '548 patent application, now U.S. Pat. No. 5,533,322, mentioned above. The improvement is particularly advantageous in that the speed and efficiency is attained without substantial additional costs involved, and especially without the need for employing a rotating head assembly with multiple carriages, that characterizes the prior art attempts at a high speed operation up to 120–140 bags per minute. What has been discovered is that with the improvement of product staging utilizing a clamp that is moved or extended along the longitudinal axis of the continuous film/tube, exceptional seal integrity as well as increased speed/efficiency in the range desired is easily attained.

The present invention takes advantage of computer control of the stepper/servo motors for performing the key motions including the motions necessary for operating a reciprocating stripper/sealing jaw carriage and film feeding. To accomplish these results, we propose synchronizing the movement of the product staging/settling clamp with the movement of the carriage and the film/tube.

In a further aspect of the invention, the movement of the carriage is provided in a substantially constant motion over a limited reciprocating or oscillating path, while the product staging and settling clamp is preferably provided in a complimentary constant motion in a path along the film/tube, but substantially 180° out-of-phase to the movement of the carriage. In accordance with the improvement, the movement of the film/tube provides the rapid accelerations and decelerations to perform the relative motion functions that result in formation of the bags, thus leaving the option to operate the carriage and the product staging/settling clamp at its maximum speed.

In accordance with another feature of the preferred embodiment of our improvement and the present invention, a combined film feeding, clamping and sealing apparatus for packaging batches of loose, relatively light weight product, such as potato chips, in a bag formed from a continuous film tube in a form, fill and seal packaging system is provided; the staging/settling clamp being extended or moved in a longitudinal path along the tube to form the batch at the earliest practical point in the cycle and then to release it at substantially the latest point in the cycle when the clamp is adjacent the sealing jaws. In this manner the cycle time is compressed but maximum settling time is available contributing to both the increased speed and maintenance of a clear seal area. Also, since the batch travels only a short distance in two short drops upon being released by the clamp, first to the blousing plates above the sealing jaws and then directly into the bag being formed, the batch remains in tact rather than spreading out where fragments or crumbs might get caught in the seal area.

The apparatus of the invention includes means for feeding the film at a variable rate, and which for maximum speed is continuous. However, in some instances according to the invention, the apparatus can be used in an intermittent film feeding mode, by simply actuating a switch. This operation interrupts the film feeding and carriage movement during sealing, while the step of extending or moving the clamp along the film/tube continues during the entire operation.

In addition to driving the carriage in a longitudinal direction along the tube, a separate means is provided for operating the sealing jaw means on the carriage for movement between closed and open positions. The sealing jaw moving means specifically moves in a first direction toward the closed position for sealing and in a second direction toward the open position to release the formed bag.

The clamping means of the invention is mounted for oscillating motion which is synchronized with the film/tube, as well as the oscillating carriage and the sealing jaw means. Since the clamp moves with the film/tube during staging the product prior to entering the bag being formed, the product is less likely to be broken or damaged, especially when the product is a relatively fragile one, such as potato chips. In other words, as each product batch is thus formed as the clamp is moving down in the same direction as the product, the chances of deleterious fragments or crumbs being formed by breakage is minimal. Also the tendency of the fragments to float and lag behind and be caught in the seal area is minimized since as the batch settles, any left on the top fall down into the interstices between the larger product components. The speed of the clamp, as it moves in and out against the film/tube, can be varied for optimum performance, including based on bag size.

In another aspect of the present invention, the control means provides for driving the carriage in a substantially constant sine wave to minimize the effects of inertia. This feature, when coupled with the use of the staging clamp also operating in the same type motion brings the packaging machine speed to its upper limit. The control means is also operative to coordinate the relative movement of the film/tube and the carriage with the up and down extension of the clamp. An increase or decrease in the film/tube speed performs a role in providing for a change in bag sizing, where needed. Also, a change in relative speed between the film/tube and the carriage and/or the clamp serves to strip/blouse/pre-blouse the bottom of the next bag being formed to assist in clearing the seal area, as well as the coalescing and settling function. Furthermore, in the preferred embodiment, the control means initiates the inward movement of the sealing jaws for the stripping function just after the release of the product batch from the clamp to optimize release of the air trapped in the bag. Also, since the clamp engages the film/tube earlier in the cycle, when the bags are being flushed with an inert gas, such as nitrogen, the path of escape of such gas out the top of the tube is blocked and thus the volume needed for each cycle is reduced.

As an additional important aspect of the present invention, the clamping means for staging of the product batches includes means for vibrating the film/tube. This additional function is carried out during at least a portion of the time that the film/tube is clamped. The vibration, which preferably includes a series of rapid upward bumps delivered to the clamp just before release of the product batch, not only temporarily loosens the product that is being staged for better nesting together and settling, but also allows pre-blousing of the bag for even better positioning and coalescing of the product batch. In the preferred embodiment, this function is carried out by simply pulsing the servo motor that serves as the extending means for the clamp.

In the preferred combination disclosed, the feeding means for the film/tube is provided by at least one stepper motor and an endless feed belt driven thereby. The 4-axis coordinator of the microprocessor provides for operating the stepper motor so as to track the movement of the driving means for the carriage and the extending means for the clamping means. As a result, the precise relative movement of the film/tube with respect to the carriage and the sealing jaw means, as well as with the clamping means is another feature allowing the maximization of packaging efficiency and machine speed.

In the related method of film feeding, clamping and sealing of a bag formed from a continuous film/tube in a form, fill and seal packaging operation, the steps include feeding a length of film/tube, driving the sealing jaws in a longitudinal direction along the film/tube, moving the sealing jaws in a first direction to engage and seal the film/tube and in a second direction toward the open position to release the formed bag, clamping the film/tube for staging/settling of each product batch above the sealing jaws as the batch is extended or moved in a longitudinal direction along the tube, and controlling these steps in a synchronized fashion for maximizing packaging efficiency and speed.

The method also contemplates controlling the driving of the carriage in a substantially constant sine wave and moving or extending the clamp along the film/tube also in a substantially constant sine wave, but 180° out of phase with the operation of the carriage and sealing jaws. Furthermore, the staging/settler clamp is vibrated during at least a portion of the time that the film/tube is being clamped to enhance the coalescence of the product batch.

In an alternative mode of operation, the film/tube feeding can be operated in an intermittent fashion. This provides the machine, and the method of the present invention with increased versatility. In this mode, the step of extending or moving the product staging/settler clamp along the longitudinal axis of the film/tube is maintained to assist in product coalescing. If the nature of the product lends itself to it, the moving clamping operation can be omitted and the clamp simply operated from a stationary position. Also, the driving of the carriage in the longitudinal direction is omitted, except to perform the stripping operation. The film feed is performed as the carriage returns upwardly for forming the next bag. In accordance with the invention, during this mode of operation, the vibratory motion can also be induced in the clamp, preferably including just prior to release of the product batch in order to further coalesce and settle the product and pre-blouse the bag.

BRIEF DESCRIPTION OF THE DRAWINGS

The accompanying drawings incorporated in and forming a part of the specification, illustrates several aspects of the present invention and together with the description serves to explain the principles of the invention.

In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
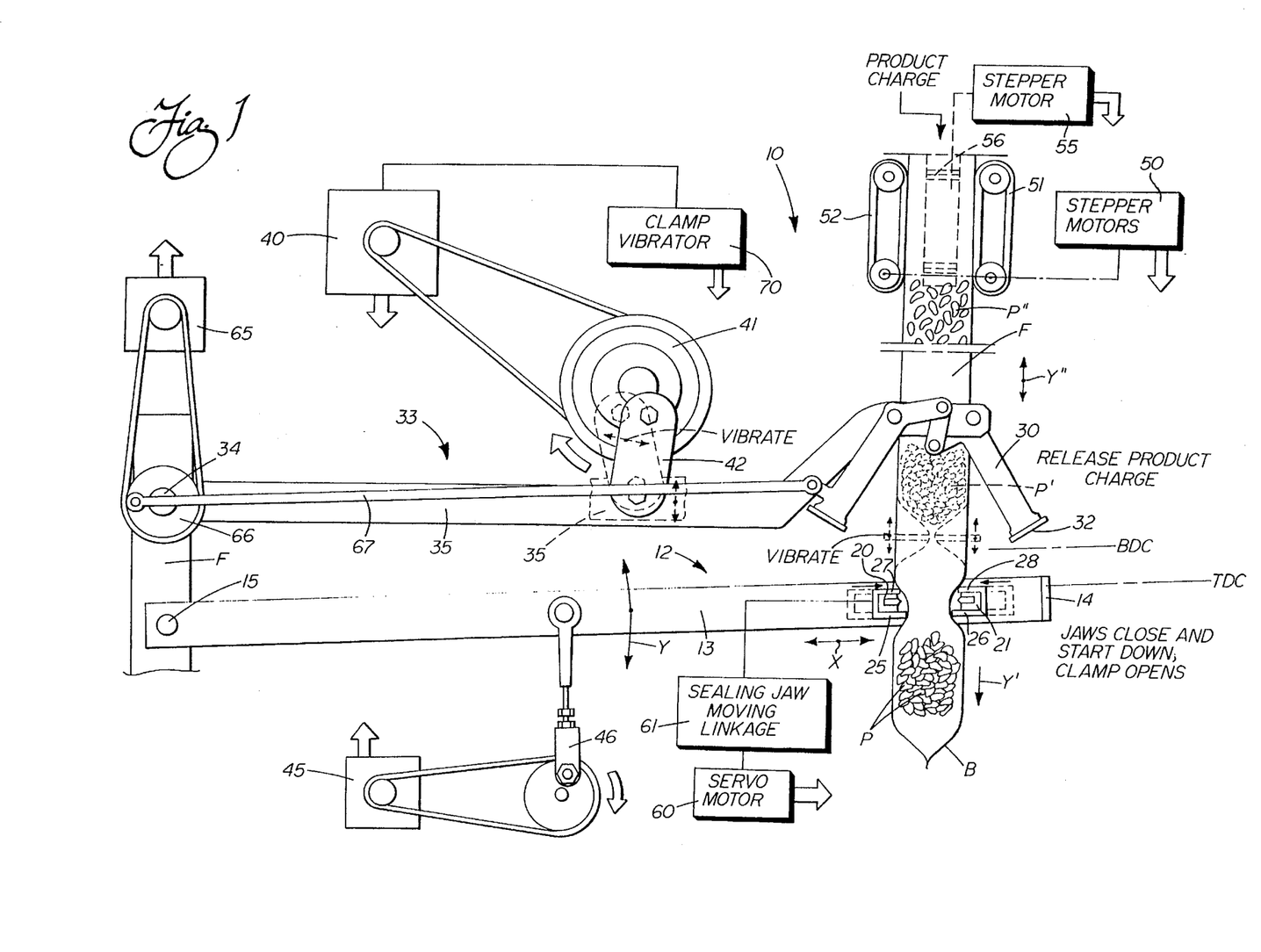
FIG. 1 is a schematic view of the feeding and sealing apparatus utilizing an oscillating carriage and clamp of the preferred embodiment of the present invention and showing a typical relationship of the components and the product being packaged.

Reference is now made to the overall schematic illustration of FIG. 1, wherein is shown an improved feeding, clamping and sealing apparatus 10 for use in packaging product batches or charges P in a bag B. As is well known in the art of form, fill and packaging systems, each bag B is sequentially formed from a continuous film F formed into a tube by a former (not shown). A carriage, generally designated by the reference numeral 12, includes a pair of swing arms 13 (only one shown) and a front cross rail 14. The swing arm 13 reciprocates or oscillates about a pivot pin 15 mounted on a rear portion of the machine frame F. The carriage 12 oscillates up and down along the film/tube F and defines a first axis of vertical movement Y.

Mounted for movement toward and away from the film/tube F is a pair of sealing jaws 20, 21, which also includes a conventional cut-off knife (also not shown); the sealing jaws 20, 21 operating in unison in a known fashion to form a transverse seal, cut and release each formed bag B. Mounted below as a part of the two sealing jaws 20, 21 are spring loaded stripper jaws or plates 25, 26 illustrated in their extended position. In the extended position, the stripper jaws 25, 26 are in a position to fully engage the film/tube F and strip any remaining product from the seal area prior to the final movement of the sealing jaws 20, 21 together for sealing. Positioned above the sealing jaws 20, 21 are provided blousing or crumb plates 27, 28. The in and out movement of the sealing jaws 20, 21 including the stripping jaws 25, 26 and the blousing plates 27, 28 occur along a second or horizontal axis X. As also illustrated in FIG. 1, the film/tube feeding is designated by an additional vertical axis Y'.

For a more complete description of the details of the carriage 12 and its components, the feeding of the film/tube F along with the basic synchronizing operation thereof, reference can be made to the '548 patent application mentioned above, and the disclosure of this application is specifically incorporated herein by reference.

Thus, in accordance with the present invention, the 3-axis motions X, Y, Y' are coordinated in the same manner as taught in this previous application in order to bring about the notable increase in package forming efficiency and the added benefit of maximizing the packaging operation speed. In the present application, the additional dimension that is added is a clamping function designed to extend or move along the film/tube F designated by the fourth axis Y". The clamping function is thus performed by a clamp 30 having two legs connected by a linkage with clamping elements 31, 32 positioned at the distal end of the legs. The clamp 30 is mounted on a separate pivoting support frame, generally designated by the reference numeral 33 and mounted about a separate fixed pivot pin 34 on the machine frame F. The support frame 33 for the clamp 30 actually includes a pair of swing members 35 (only one shown) to support the clamp 30 in a position to embrace the film/tube F as the frame 33 oscillates in timed relationship with the carriage 12.

In order to provide the oscillating motion of the clamp 30 along the longitudinal axis of the film/tube F, there is provided a first servo motor 40 that through a belt drives a crank wheel 41, in turn to which is attached a driving link 42. The link 42 is pivotally attached to the swing member 35, as shown in FIG. 1.

Similarly, a second servo motor 45 driving a crank and linkage assembly 46 serves to perform the oscillating drive action of the carriage 12. To feed the film/tube F is provided one or more stepper motors 50 that drive feed belts 51, 52 positioned on opposite sides of the film/tube; whereas, a similar stepper motor 55 serves the function of driving a film seal belt 56; it being understood that all of the belts 51, 52 and 56 operate against a mandrel (not shown) inside the film/tube F.

A third servo motor 60, operates through a linkage 61 for selectively moving the sealing jaws 25, 26 in a first direction toward the closed position for sealing, as illustrated in FIG. 1 by movement from the dashed line position to the full line position. Of course, the sealing jaws 25, 26 are moved in a second direction toward the open position to release the formed bag B in response to the opposite rotation of the servo motor 60.

Finally, a fourth servo motor 65 is provided to rotate a crank 66 about the pivot pin 34. Pivotally attached to the wheel 66 is an actuator arm 67 that has its distal end connected to at least one of the inside leg of the clamp 30.

Figure 4:
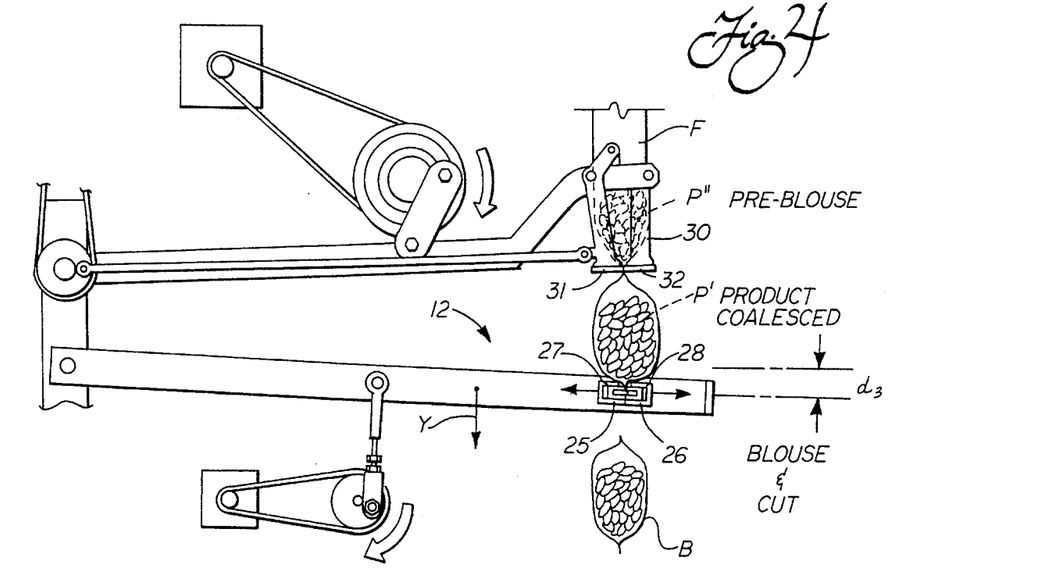
FIG. 4 is the next illustration in the operation of the feeding, clamping and sealing apparatus and method of the present invention wherein the sealing operation is complete, the optional blousing and pre-blousing operations are in process and the clamp is beginning to capture and stage the next product batch.

The clamp 30 is subjected to one additional motion during operation in accordance with the present invention, and this motion is preferably provided by a clamp vibrator 70, which in the preferred embodiment shown is performed by pulsing the servo motor 40 to bodily move the wheel 41, as illustrated in FIG. 4. Upon activation of the vibrator 70, the entire wheel 41 is vibrated up and down, as illustrated by the dashed line position, which in turn vibrates or bumps the clamp elements 31, 32 during engagement with the film/tube F to aid in coalescing/settling the product.

Each of the servo and stepper motors 40, 45, 50, 55, 60 and 65, are all interconnected through a 4-axis coordinator 75 (see FIG. 9), and as designated by the full bodied arrows illustrated in FIG. 1. Preferably, the coordinator 75, and more broadly the control means for the entire feeding, clamping and sealing apparatus 10 of the present invention, is a part of a central processing unit (CPU) 76. The preferred embodiment of the CPU 61 is based on an IBM compatible PC 486 with a MS/DOS operating system; although in accordance with the broader aspects of the present invention it is understood that other control means or computers operating on different operating systems can be employed. As designated by the additional full bodied function arrow of the CPU 76 in FIG. 9, all input/output and ancillary machine functions are preferably operated directly from the CPU 76. In addition, a suitable machine/man interface 77 is included, and may take the form of a conventional word processing key board.

It should also be understood by those skilled in the art that by programming changes through the interface 77, variations in the operations of any of the components involving any one or more of the four axes, can be introduced into the system to suit the specific needs of the end user. For example, with different products a change in sequence of the clamp 30 operation may bring about a significant gain in efficiency of assuring a clear seal area and/or an increase in cycle speed. Also, motors other than servo motors may be employed within the broader aspects of the invention. For example, a less expensive stepper motor or variable D.C. motor may be substituted in lieu of the servo motor 65; either of which motors in this particular case allows the speed of movement of the in and out motion of the clamp 30 to be varied to suit the particular girth size of the film/tube. For small bags, the inward clamp movement can be accelerated to provide the maximum clamping time; whereas, for large bags the inward movement may be slowed to prevent formation of wrinkles along the bag adjacent the seal.

From the description so far, and by reference back to the '548 application, it will be realized that an important enhancement to the form, fill and seal packaging machine and method is provided by the addition of the clamp 30, and including a means for extending or moving the clamp 30 in a longitudinal direction along the film/tube F in a unique manner. As can be seen with reference back to FIG. 1 of the drawings, the clamp 30 in the dashed line position of the clamp elements 31, 32, are operative for staging the product batch P' in a compact nested position in readiness for a short drop downwardly onto the blousing plates 27, 28 (see FIG. 2) and in a second short drop to enter the bag B being formed (note full line position of the product batch P after being released in FIG. 1). By forming the product batch prior to entering the bag B the batch has a chance to coalesce and nest together, which feature is particularly important to maintain a clear seal area for relatively light, loose product, such as potato chips. That is, by the time the batch P' is coalesced by the action of the clamp 30, including by vibration, and in addition further settled by the two short drops after release, any small fragments or crumbs R (see FIG. 1) have slipped down into the body of the batch P and are held captive so that they cannot be trapped in the seal area.

The 4-axis coordinator 75 not only serves to control the movement of the clamp 30 along the axis Y", as performed by the first servo motor 40, but also serves to control the in and out actuation. This control of the clamp 30 operation is in response to the fourth servo motor 65. Similarly, the axis Y designating the movement of the carriage 12 is controlled by the coordinator 75 by operation of the servo motor 45; whereas, the axis Y movement is controlled by operation of the servo motor 60. Finally, as will be understood, the Y' axis illustrating the feed of the film/tube F is likewise controlled by the coordinator 75 by operation of the stepper motors 50. Of course, each of the servo motors 40, 45, 60 and 65 incorporate encoders (not shown) and the stepper motors 50, 52 are provided with feedback means to the 4-axis coordinator 75 to assure synchronization and coordination of all of the motions of axes Y, X, Y' and Y".

In operation, reference will first be made to the illustration in FIG. 1 wherein the feeding of the film/tube along the axis Y' is being carried out in a continuous, but a variable feed rate by operation of the belts 51, 52 through the stepper motors 50. The back seam is being formed by the heated belt 56 driven by the stepper motor 55. The carriage 12 is being driven by the servo motor 45 to start the movement of the sealing jaws 20, 21 with the attached stripper jaws 25, 26 in the downward direction along the axis Y'. As illustrated, the stripper jaws 25, 26 initially engage the sides of the bag B being formed in response to movement by the servo motor 60. Just prior to this point, the clamp elements 31, 32 move away from the dashed line position of FIG. 1 to allow the product batch P' in its staged dotted line position to fall the short distance directly onto the blousing plates 27, 28 (see full line position of the batch P' in FIG. 2). Preferably, at least in the last phase of the staging by the clamp 30, the clamp elements 31, 32 (dashed line outline position) vibrate, such as by an upward bump(s), by activation of the clamp vibrator 70. All of these actions, including the timing and pattern of the vibration of the clamp 30, are programmed into the CPU to best suit the size of the bag B and the product P.

As illustrated, the clamp elements 31, 32 move away from the film/tube F to their full line position just before the sealing jaws 20, 21 with the blousing plates 27, 28 carried thereby move from their corresponding dotted line position. In this manner, the air being displaced by the product batch P and the squeezing of the bag B can be quickly expelled through the open clamp 30 and with minimal deleterious consequences to the staged product batch P'. Also, as will be more fully understood as the operation description progresses, at this time, a second or following product batch P" is on its way through the upper portion of the film/tube F ready to be captured by the clamp 30.

Figure 1A:
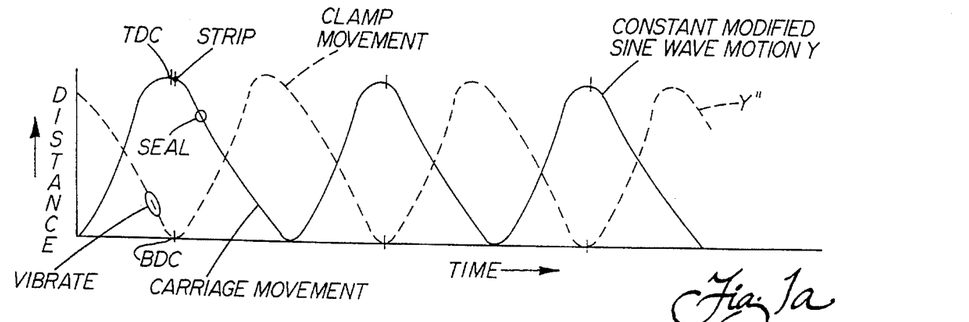
FIG. 1a is a representative showing in graphical form of the constant modified sine wave profile of the motion of the carriage with the corresponding product staging/settler clamp movement interposed as a dashed line.

One of the important aspects of the present invention is that the movement of the carriage 12 is programmed such that the top dead center (TDC) occurs in synchronization with the bottom dead center (BDC) of the clamp 30, as can best be seen by comparing the schematic illustration in FIG. 1 with the graph shown in FIG. 1a. As will be realized, this means that the product charge P' being staged moves to a position adjacent to the clamping jaws 20, 21 just at the right moment when the clamp opens. Preferably, the clamp opens at 0"–3" above BDC to provide maximum timing to release the air and to admit the inert gas, and also when the distance that the batch P' must drop in the two steps into the bag B is at a minimum. At this point, since the batch P' is coalesced and settled, it can enter the bag B without being substantially separated and while holding the fragments/crumbs R captive. This means that the seal area, that is being stripped by the stripper jaws 25, 26 is already virtually free of floating or lagging particles and crumbs so as to insure that a good clean seal is obtained. The programmed CPU 76 and the 4-axis coordinator 75 is operative to assure this performance feature so as to provide the exceptional seal integrity that is desired. Furthermore, the other main favorable result and advantage of the present invention over the prior art form, fill and seal operations of reducing the cycle time, and thus increasing the overall speed of the packaging operation, is realized.

Figure 2:
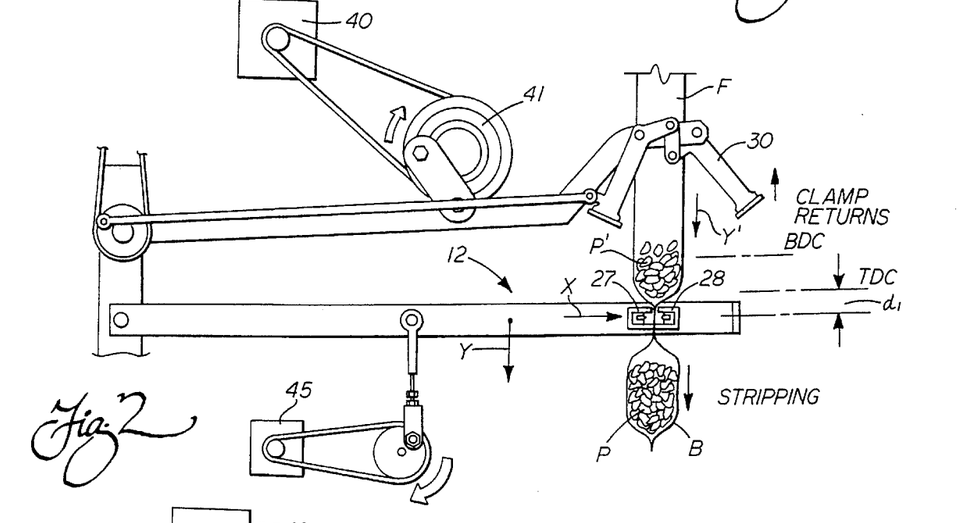
FIG. 2 is a schematic illustration of the position of the carriage and the sealing jaws occurring just after the position shown in full line outline in FIG. 1; i.e. the carriage extending through the stripping operation having started at top dead center (TDC) and the clamp having moved up on its return stroke from the bottom dead center position (BDC)

With further reference to FIG. 2 of the drawings, the carriage 12 moves by operation of its servo motor 45 in response to the coordinator 75 through the full relative stripping distance $d_1$ with respect to the film/tube F, and the clamp 30 in response to its servo motor 40 and crank wheel 41 to its top dead center position. To visualize the relative positioning of the carriage 12, the clamp 30 and the other components of the apparatus, reference can be made to the strip designating dots and the seal circles, as well as the vibrate designation oval, in FIGS. 1a and 9.

Figure 3:
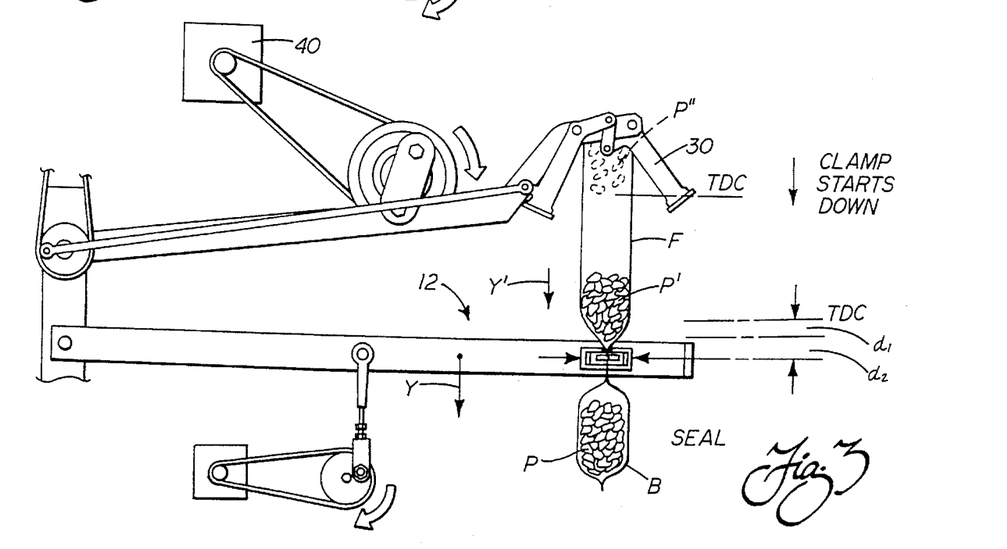
FIG. 3 is a schematic representation of the carriage having moved through the sealing portion of its movement and the product staging/settler clamp starting its downward movement for capturing and staging the next product batch.

Following the progress of the film feeding, clamping and sealing operation to the FIG. 3 illustration, the bag B is now sealed through the movement of the sealing jaws 20, 21 on the carriage 12, which is synchronized with the continuous movement of the film F along the axis Y'. At this time, the servo motor 40 moves the clamp 30 past its TDC and is now moving downwardly ready to capture the next batch P''' in flight. In this illustration, the synchronized movement to accomplish the sealing function is represented by the distance $d_2$.

Then moving on to FIG. 4, the relative movement between the film/tube F and the carriage 12, as represented by the distance $d_3$, causes an upward blousing effect to further coalesce the product batch P', which is now more fully resting on the blousing plates 27, 28. At this time, the sealing jaws 20, 21 are released so that the completed bag B, that is now also cut from the film/tube F, falls away. At the same time that the next bag with the product batch P' is being bloused, the relative movement of the film/tube F and the clamp 30 is also effective to pre-blouse the next in line batch or charge P'''.

Figure 5:
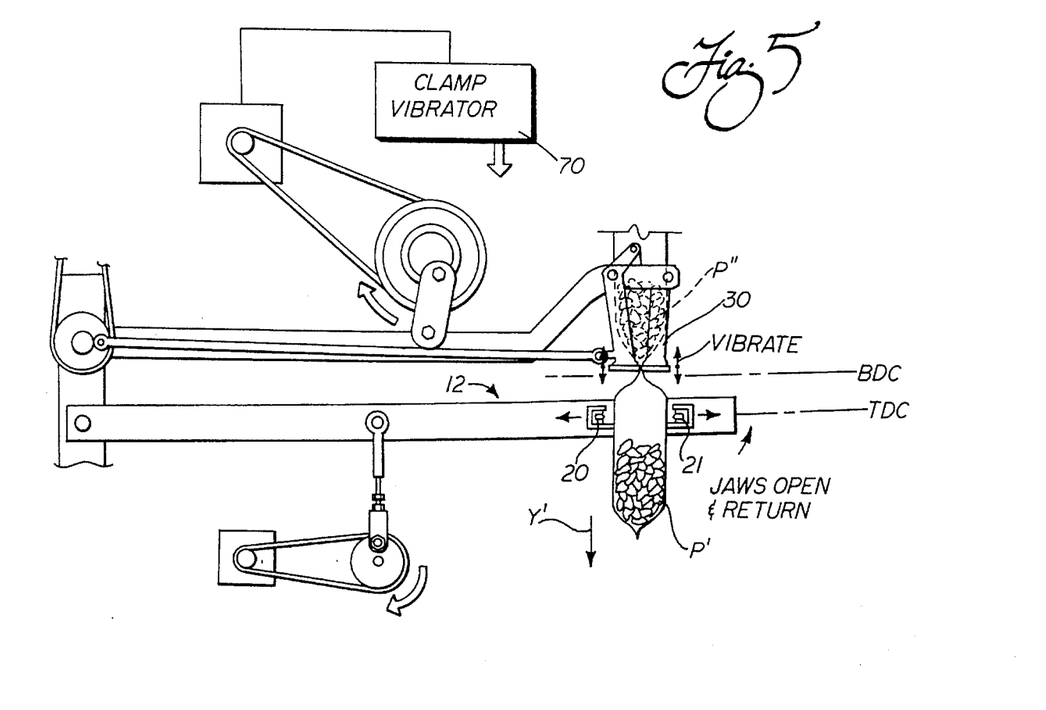
FIG. 5 is a similar illustration of the apparatus and method in the next phase of operation wherein the carriage is moved upwardly to TDC in readiness for the stripping operation, with the clamp having moved downwardly adjacent to the sealing jaws, the next product batch having been staged and settled; and including the operation of clamp vibration (cf. dashed line position in FIG. 1)

Finally, in FIG. 5 to illustrate the final relative position of the components in the preferred embodiment of the form, fill and seal packaging machine operating in a continuous mode, the clamp 30 is moving toward BDC, the clamp vibrator 70 is actuated and the open sealing jaws 20, 21 carried by the carriage 12 are at TDC. At this time, reference can be made back to FIG. 1 where the clamp elements 31, 32 are once again opened by the servo motor 65, and simultaneously the sealing jaws 20, 21 are closed. The staged product P''' (P' in FIG. 1) is now allowed to drop the short distance to the stripper plates 27, 28 where the batch is then ready to enter the bag B being formed.

From the foregoing description of the film feeding, clamping and sealing system of the present invention and the method, as represented by the steps set forth in FIGS. 1–5, it can be realized that there is an exceptional improvement in the sealing efficiency and speed of the continuous motion packaging machine and/or method over that illustrated and claimed in the '548 application. By providing for the clamp 30 that is capable of extending or moving along the longitudinal axis of the film/tube F, the product batch P is efficiently staged and coalesced for providing more efficient movement as a cohesive unit into the bag B being formed. From tests performed, it is proven that there is virtually no chance of a product fragment being left loose to float or lag behind to degrade the seal integrity. In addition, the product batch P' at the staging position can be efficiently vibrated and further settled by rapid movement of the clamp elements 31, 32 in response to the activation of the clamp vibrator 70. Precise control of all of the functions to synchronize the continuous feeding of the film along the axis Y', driving of the carriage 12 along the axis Y, moving the sealing jaws along the axis X and extending the clamp along the axis Y'' is obtained in an efficient manner by the 4-axis coordinator 75 of the CPU 76.

Figure 9:
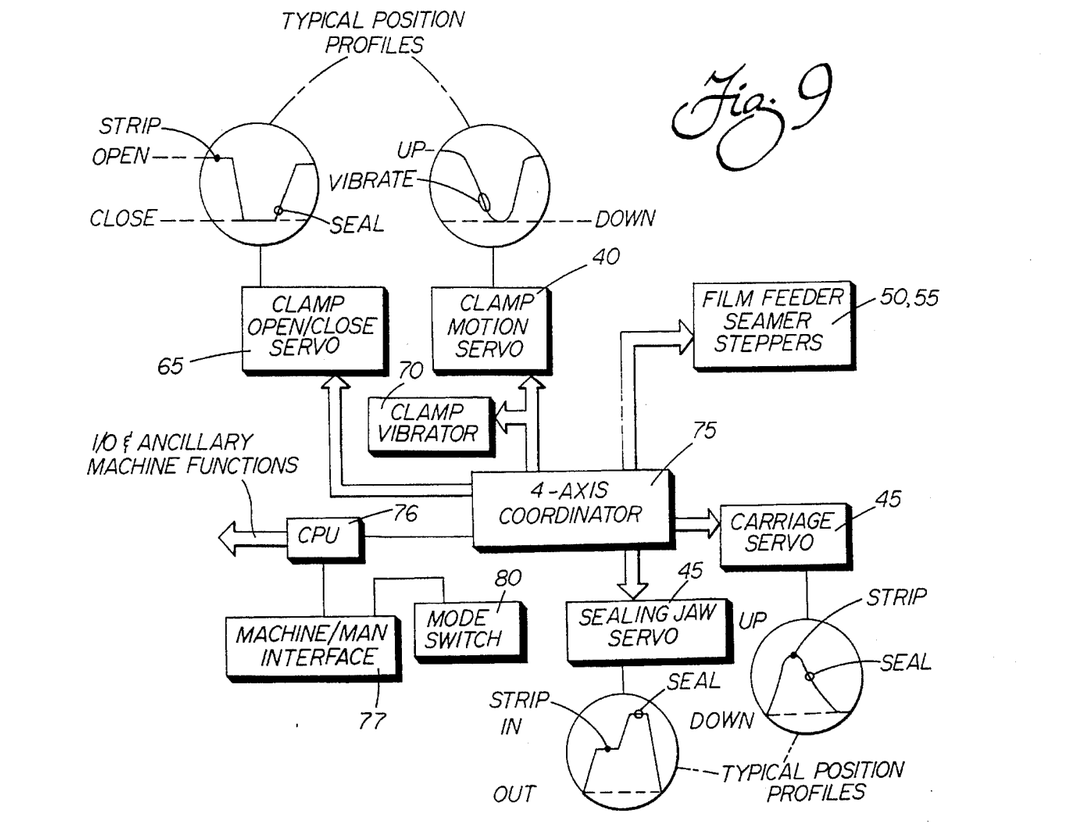
FIG. 9 is a full schematic illustration in block diagram form showing a computerized system for carrying out the principles of the preferred embodiment of the present invention applicable to the preferred continuous film feed mode.

In another aspect of the present invention, the film feeding, clamping and sealing apparatus 10, and the related method, can be operated in an intermittent mode. In order to provide for this feature, a mode switch 80 is provided; it being understood that the switch 80 can be in the form of one or more separate components, or preferably forms a portion of the machine/man interface 77, as illustrated in FIG. 9.

Figure 6:
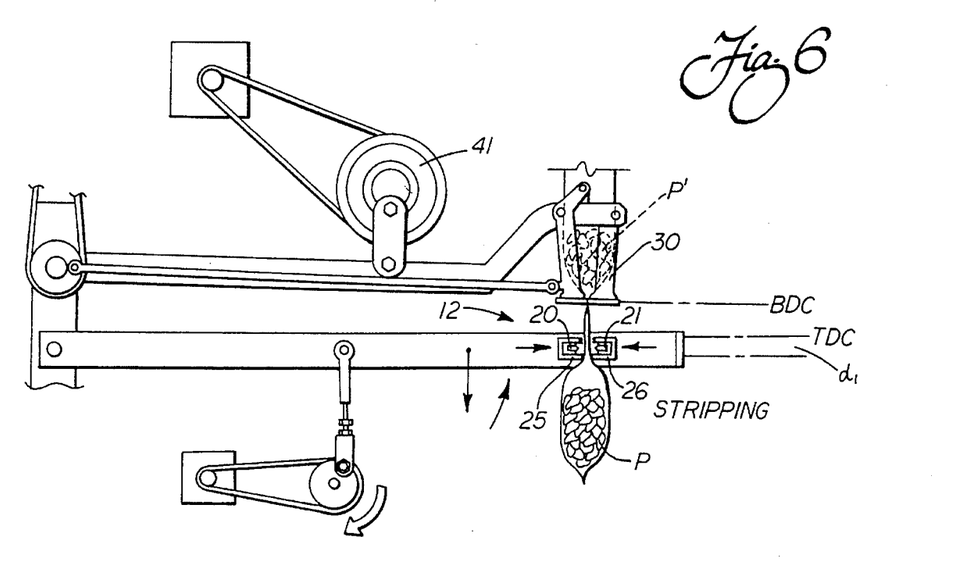
FIGS. 6–8 illustrate the alternative mode of operation wherein the film/tube is fed intermittently and in sequence the stripping operation, the sealing operation and the film/tube feeding operation are performed, respectively.

In this intermittent mode of operation, as illustrated starting in FIG. 6, the clamp 30 is first positioned so as to be at the BDC position. The clamp 30 may remain closed and at BDC during the stripping operation, as carried out by the movement of the carriage 12 and the partial inward movement of the sealing jaws 20, 21 to bring the stripping jaws 25, 26 into their operative position.

Figure 7:
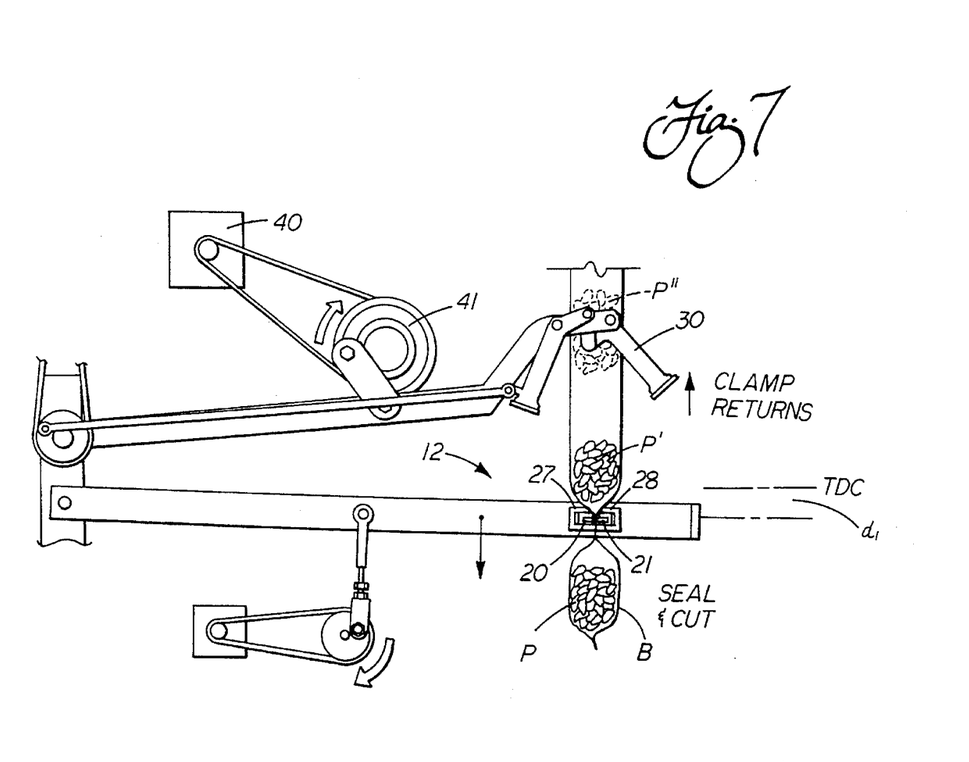

As illustrated in FIG. 6, the stripping is completed over a relative distance $d_1$, and in FIG. 7 the sealing jaws 20, 21 complete the sealing and cutting operations to finish the bag B. In the meantime, the clamp 30 is released and extends rapidly upwardly in the longitudinal direction to capture the next in line product batch P''' while the batch P' is resting on the plates 27, 28.

Figure 8:
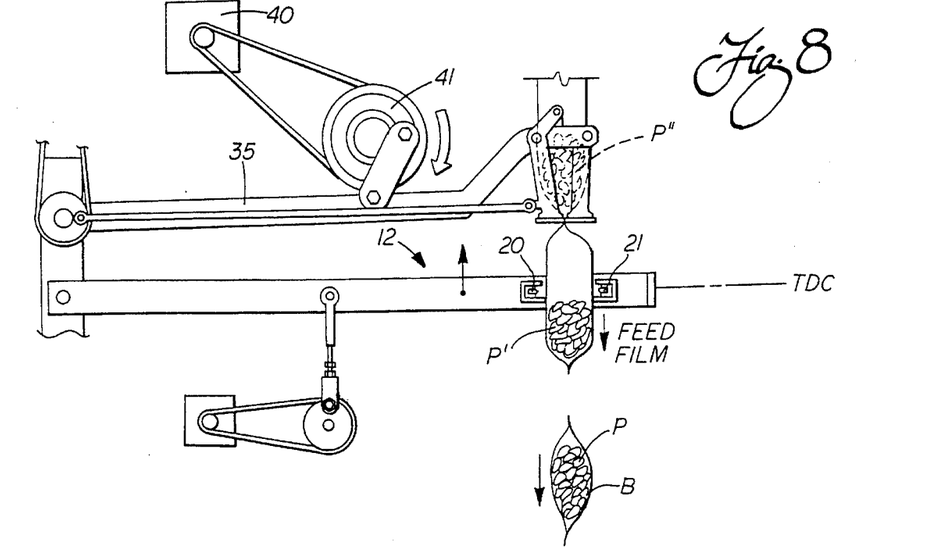

In this intermittent mode, only after the sealing jaws 20, 21 retract and the carriage 12 is returning to its TDC position is the film/tube F fed forward. The cycle is ready to be repeated only after the full length of film corresponding to the bag being formed moves between the open jaws 20, 21, as shown in FIG. 8. The same advantages as gained with the moving clamp 30 in the preferred embodiment are obtained here, including better coalescing and minimizing breakage in the product batch P''' since it is dropping into a moving target. If desired for certain product packaging operations, the clamp 30 can be programmed to simply remain stationary at BDC during the entire cycle. By provision for these intermittent film feed modes of operation, the user of the form, fill and packaging machine of the present invention is provided with additional options that heretofore have not been available.

The method of the present invention also provides significant advantages over the methods of the prior art where a tube of film is formed, filled with a product and sealed in an integral packaging operation. As indicated above, in the method of the present invention, the feeding of the film/tube F, and the driving and moving of the sealing jaws 20, 21 to form each bag in succession is carried out in synchronization with the clamping of the film/tube F above the sealing jaws 20, 21 for staging of each product batch P. Advantageously, the clamping is performed during continuous feeding of the film/tube F in the longitudinal direction. The clamp is released to allow the product batch to fall the short distance to the blousing plates 27, 28, and finally into the bag B being formed. In either the embodiment of FIGS. 1–5, or the intermittent embodiment of FIGS. 6–8 where the clamp 30 moves along with the film/tube F, the staging of the product batch P' during the film/tube F feeding as the clamp moves in synchronization causes the cycle time to be minimized. The product batch P' is released adjacent the sealing jaws, which adds to the conservation of the cycle time. Also, since the product is engaging the clamp 30 as it is moving in the same direction as the product, breakage of the product to form smaller fragments or crumbs is minimized. In this manner, the film/tube F feeding, the clamping and the bag B sealing is performed in a precise and synchronized manner for enhancing the seal integrity, while at the same time maximizing the packaging operation speed.

In summary, results and advantages that exceed those obtained in the prior art will now be apparent. In the film feeding, clamping and sealing apparatus and method for use in packaging a product batch P in a form, fill and seal packaging operation is provided. There is improved efficiency in controlling each product batch P to minimize floating or lagging fragments or crumbs R that could otherwise be caught in the seal area. Furthermore, the product staging by the clamp 30 during the step of extending or moving the clamp along the film/tube F is unique. The carriage 12 with the sealing jaws 20, 21 preferably operate in a continuous modified sine wave motion and the clamp 30 is controlled by the coordinator 75 so as to move with substantially the same motion but 180° out-of-phase to the movement of the carriage (see FIG. 1a). Because the clamp 30 and carriage operate together in this manner, the cycle time for each product batch P is minimized. The clamp moving with the film/tube F catches each product batch P'" in motion at an early point so as to stage and settle the product over an extended time in a most efficient fashion. When the product batch P' is released in juxtaposition to the sealing jaws 20, 21, it is dropped only a short distance to the blousing plates 27, 28 and then through a final short drop into the bag being formed.

The foregoing description of a preferred embodiment of the invention has been presented for purposes of illustration and description. It is not intended to be exhaustive or to limit the invention to the precise form disclosed. Obvious modifications or variations are possible in light of the above teachings. The preferred embodiment in the environment of a continuous film feed machine/method, along with the alternative intermittent embodiments, were chosen and described to provide the best illustration of the principles of the invention and its practical applications to thereby enable one of ordinary skill in the art to utilize the invention in its various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A film feeding, clamping and sealing apparatus for use in packaging a product batch in a bag formed from a continuous tube of film in a form, fill and seal packaging machine, comprising:

means for feeding said film at a variable rate;

a carriage;

means for driving said carriage in a longitudinal direction along said tube;

sealing jaw means mounted on said carriage for movement between closed and open positions;

means mounted on said carriage and connecting to said sealing jaw means for selectively moving said sealing jaw means in a first direction toward the closed position for sealing, and moving said sealing jaw means in a second direction toward the open position to release the formed bag;

clamping means mounted above said sealing jaw means to clamp the film/tube for staging the product to form a product batch prior to entering the bag being formed;

actuator means for opening and closing said clamping means;

means for moving said clamping means in a longitudinal direction along said tube; and control means programmable to synchronize said feeding means, said driving means, said moving means, said actuator means and said extending means, whereby said film feeding, bag sealing and film/tube clamping is performed in a precise and synchronized manner with product batch staging to maintain a clear seal area and for maximizing packaging machine speed.

2. The film feeding, clamping and sealing apparatus of claim 1, wherein said control means provides for said driving means for said carriage to operate in a substantially constant sine wave to minimize the effects of inertia on said carriage and for said extending means for said clamping means to operate in a substantially constant sine wave approximately 180° out-of-phase to movement of the carriage to further maximize the packaging machine speed.

3. The film feeding, clamping and sealing apparatus of claim 2, wherein said control means is operative to coordinate the relative movement of said clamping means and said carriage for positioning said clamping means at substantially bottom dead center when said sealing means is at substantially top dead center to minimize the final drop of said product batch.

4. The film feeding, clamping and sealing apparatus of claim 1, wherein is further provided means for vibrating said clamping means during at least a portion of the time that the film/tube is clamped for staging the product, whereby the product batch is coalesced and settled prior to entering the bag being formed.

5. The film feeding, clamping and sealing apparatus of claim 1, wherein said moving means for said clamping means includes a servo motor operated by said control means, said clamping means including a pivoting support frame and a pair of gripping members pivotally carried on the end of said frame.

6. The film feeding, clamping and sealing apparatus of claim 5, wherein:

said driving means includes a second servo motor operating said carriage; said control means operating said first servo motor for moving said clamping means to track said second servo motor for driving said carriage.

7. The film feeding, clamping and sealing apparatus of claim 1, wherein:

said feeding means for said film/tube includes at least one stepper motor for continuous, variable rate feeding and operative so as to track the movement of said driving means for said carriage;

said moving means for said clamping means also operating so as to track the movement of said driving means for said carriage;

each of the stepper motor, driving means and moving means being independent of each other but controlled by said control means to provide full synchronization of the film feeding, product batch staging and bag sealing operation.

8. The film feeding, clamping and sealing apparatus of claim 6, wherein:

said moving means for said sealing jaw means includes a third servo motor for moving said sealing jaws between the closed and open positions.

9. The film feeding, clamping and sealing apparatus of claim 1 wherein:

said control means includes at least a 4-axis coordinator to carry out the full functional operation of film feeding, product batch staging, carriage movement and bag sealing.

10. The film feeding, clamping and sealing apparatus of claim 7 wherein:

said control means is operative to control said stepper motor so as to vary the relative film feed during the sealing and clamping operations to blouse and pre-blouse said film/tube;

whereby the bag is opened to better receive the product batch.

11. The film feeding, clamping and sealing apparatus of claim 1 wherein:

stripper jaws are provided below said sealing jaw means for movement therewith and extending toward said film/tube;

said control means being operative for moving said sealing jaws means partially in said first direction to engage said stripper jaws prior to sealing.

12. The film feeding, clamping and sealing apparatus of claim 1 wherein:

said control means includes mode switching means to interrupt said feeding means for said film/tube and said driving means for said carriage during the sealing operation, but to maintain said moving means for said clamping means during substantially the entire packaging operation;

whereby intermittent motion packaging with staging is provided.

13. A method of feeding, clamping and sealing a tube of film to form a bag to be filled with a product in a form, fill and seal packaging operation by a pair of sealing jaws comprising the steps of:

feeding a length of film/tube corresponding to the bag length in a longitudinal direction between said pair of sealing jaws;

driving said sealing jaws in said longitudinal direction along a length of the film/tube;

varying the feed of the film to coordinate the relative movement of said film/tube and said sealing jaws for forming the bag;

moving said sealing jaws in a first direction to engage and seal on opposite sides of the film/tube;

moving said sealing jaws in a second direction toward the open position to release the formed bag;

driving said sealing jaws in the direction opposite to that of bag forming along the length of said film/tube to provide a new bag length;

clamping said film/tube by a clamp for staging of the product above said sealing jaws to form a product batch prior to entering the bag being formed;

moving said clamp in said longitudinal direction during the formation of said product batch; and controlling the film/tube feeding, clamping and the bag sealing in a precise and synchronized manner to provide the product batch staging to maintain a clear seal area and for maximizing the packaging operation speed.

14. The method of film feeding, clamping and sealing to form a bag in accordance with claim 13, wherein is further provided:

driving said sealing jaws in the longitudinal direction along said film/tube in a substantially constant sine wave to minimize the effects of inertia; and the step of moving said clamp along said film/tube operates in a substantially constant sine wave approximately 180° out-of-phase to movement of the carriage to further maximize the packaging film speed.

15. The method of film feeding, clamping and sealing to form a bag in accordance with claim 13, wherein is further provided:

during the controlling step coordinating the driving of said sealing jaws and moving the clamp so that the sealing jaws are at substantially top dead center at the time when said clamp is at substantially bottom dead center in order to minimize the final drop of the product batch into the next bag to be formed.

16. The method of film feeding, clamping and sealing to form a bag in accordance with claim 13, wherein is further provided:

vibrating said clamp during at least a portion of the time during staging of the product so as to coalesce and settle the product into a batch prior to entering the next bag to be formed.

17. The method of film feeding, clamping and sealing to form a bag in accordance with claim 13, wherein is further provided:

feeding the film/tube in a continuous, variable rate motion operative so as to track the driving of said sealing jaws;

said driving step being performed so as to be patterned substantially as a modified sine wave whereby there is full synchronization and optimization of the speed of the film feeding, product batch staging and the bag sealing operation.

18. The method of film feeding, clamping and sealing to form a bag in accordance with claim 17, wherein is further provided:

switching the mode of operation to interrupt the step of feeding said film/tube and to interrupt driving said sealing jaws during the sealing operation, but maintaining the step of extending the clamp along the film/tube during at least a portion of the operation, whereby the method of packaging is switched to intermittent motion.

19. A method of packaging a product batch in a bag formed from a continuous tube of film in a form, fill and seal packaging operation including feeding of the film and driving and moving sealing jaws to form each bag in succession, the improvement comprising:

clamping the film/tube above the sealing jaws by a clamp to form the product batch for staging prior to entering the bag being formed;

performing the step of clamping during the time of feeding the film/tube in the longitudinal direction while moving the clamp in the same direction; and releasing the clamp to allow the product batch to enter said bag, whereby the film/tube feeding and bag sealing operation is performed in a precise and synchronized manner to provide the product batch staging for maintaining a clear seal area and for maximizing the packaging operation speed.

20. The method of packaging the product batch in accordance with claim 19, wherein is provided the step of synchronizing the film feeding, with the clamping of the film/tube for product batch staging and bag sealing.

21. The method of packaging the product batch in accordance with claim 20, wherein is further provided the steps of driving said sealing jaws and moving the clamp in the longitudinal direction in substantially sine wave motions that are approximately 180° out-of-phase.

22. The method of packaging the product batch in accordance with claim 19, wherein the step of moving the clamp includes relatively moving away from the sealing jaws during the step of releasing the clamp, and moving relatively toward said sealing jaws during clamping and into juxtaposition with the sealing jaws, whereby the product batch is staged during the film tube feeding and released in juxtaposition to said sealing jaws.

23. The method of packaging the product batch in accordance with claim 22, wherein is further provided varying the speed of step of clamping the film/tube in accordance with the bag size being packaged.

24. The method of packaging the product batch in accordance with claim 19, wherein driving of the sealing jaws is along the longitudinal axis of said film/tube and includes movement provided by a servo motor; and pulsing said servo motor to vibrate said film/tube to coalesce said product batch prior to releasing said clamp.

* * * * *

UNITED STATES PATENT AND TRADEMARK OFFICE
CERTIFICATE OF CORRECTION

Page 1 of 4

PATENT NO. : 5,540,035
DATED : July 30, 1996
INVENTOR(S) : Jack E. Plahm, et. al.

It is certified that error appears in the above-indentified patent and tthat said Letters Patent is hereby corrected as shown below:

Column 13, line 37, cancel beginning with "1. A film feeding" to and including "speed." in column 14, line 2, and insert the following claim:

1. A film feeding, clamping and sealing apparatus for use in packaging a product batch in a bag formed from a continuous tube of film in a form, fill and seal packaging machine, comprising:

means for feeding said film at a variable rate;

a carriage;

means for driving said carriage in a longitudinal direction along said tube;

sealing jaw means mounted on said carriage for movement between closed and open positions;

means mounted on said carriage and connecting to said sealing jaw means for selectively moving said sealing jaw means in a first direction toward the closed position for sealing, and moving said sealing jaw means in a second direction toward the open position to release the formed bag;

clamping means mounted above said sealing jaw means to clamp the film/tube for staging the product to form a product batch prior to entering the bag being formed;

actuator means for opening and closing said clamping means;

means for moving said clamping means for bodily extending in a longitudinal direction along said tube; and control means programmable to synchronize said feeding means, said driving means, said sealing jaw

UNITED STATES PATENT AND TRADEMARK OFFICE
CERTIFICATE OF CORRECTION

PATENT NO. : 5,540,035
DATED : July 30, 1996
INVENTOR(S) : Jack E. Plahm, et. al.

It is certified that error appears in the above-indentified patent and that said Letters Patent is hereby corrected as shown below:

moving means, said actuator means and said extending means,
    said control means being for varying the movement of said film/tube and for bodily moving/extending said sealing jaws and said clamping means in the longitudinal direction to coordinate the relative movement of said film/tube, said carriage/sealing jaws and said clamping means;
    whereby said film feeding, bag sealing and film/tube clamping is performed in a precise and synchronized manner with product batch staging to maintain a clear seal area and for maximizing packaging machine speed.

Column 15, line 21, cancel beginning with "13. A method of" to and including "speed." in column 15, line 51, and insert the following claim:
    13. A method of feeding, clamping and sealing a tube or film to form a bag to be filled with a product in a form, fill and seal packaging operation by a pair of sealing jaws comprising the steps of:
    feeding a length of film/tube corresponding to the bag length in a longitudinal direction between said pair of sealing jaws;
    driving said sealing jaws in said longitudinal direction along a length of the film/tube;
    varying the feed of the film to coordinate the relative movement of said film/tube and said sealing jaws for forming the bag;
    moving said sealing jaws in a first direction

UNITED STATES PATENT AND TRADEMARK OFFICE
CERTIFICATE OF CORRECTION

PATENT NO. : 5,540,035
DATED : July 30, 1996
INVENTOR(S) : Jack E. Plahm, et. al.

It is certified that error appears in the above-indentified patent and that said Letters Patent is hereby corrected as shown below:

to engage and seal on opposite sides of the film/tube;
moving said sealing jaws in a second direction toward the open position to release the formed bag;
driving said sealing jaws in the direction opposite to that of bag forming along the length of said film/tube to provide a new bag length;
clamping said film/tube by a clamp for staging of the product above said sealing jaws to form a product batch prior to entering the bag being formed;
moving said clamp for bodily extending in said longitudinal direction during the formation of said product batch; and
controlling the film/tube feeding, clamping and the bag sealing in a precise and synchronized manner;
said controlling step being for varying the movement of said film/tube and for bodily moving/extending said sealing jaws and said clamping means in the longitudinal direction to coordinate the relative movement of said film/tube, said carriage/sealing jaws and said clamping means to provide the product batch staging to maintain a clear seal area and for maximizing the packaging operation speed.

Column 16, line 32, cancel beginning with "19. A method of" to and including "operation speed." in column 16, line 49, and insert the following claim:
19. A method of packaging a product batch in a bag formed from a continuous tube of film in a form, fill and seal packaging operation including feeding of the film and driving of a carriage and moving sealing jaws and

UNITED STATES PATENT AND TRADEMARK OFFICE
CERTIFICATE OF CORRECTION

PATENT NO. : 5,540,035
DATED : July 30, 1996
INVENTOR(S) : Jack E. Plahm, et. al.

It is certified that error appears in the above-indentified patent and that said Letters Patent is hereby corrected as shown below:

clamping means to form each bag in succession, the improvement comprising:

clamping the film/tube above the sealing jaws by a clamp to form the product batch for staging prior to entering the bag being formed;

performing the step of clamping during the time of feeding the film/tube in the longitudinal direction while moving the clamp for bodily extending in the longitudinal direction; and     releasing the clamp to allow the product batch to enter said bag,     whereby the film/tube feeding and bag sealing operation is performed to provide the movement of said film/tube and for bodily moving/extending said sealing jaws and said clamping means in the longitudinal direction to coordinate the relative movement of said film/tube, said carriage/sealing jaws and said clamping means in a precise and synchronized manner to provide the product batch staging for maintaining a clear seal area and for maximizing the packaging operation speed.

Signed and Sealed this

Seventeenth Day of December, 1996

Attest:

BRUCE LEHMAN

*Attesting Officer*     *Commissioner of Patents and Trademarks*